June 2, 1953     D. HOPPENSTAND     2,640,565
BRAKE STRUCTURE
Original Filed May 3, 1946     4 Sheets-Sheet 1

INVENTOR
David Hoppenstand
BY
ATTORNEYS

June 2, 1953  D. HOPPENSTAND  2,640,565
BRAKE STRUCTURE
Original Filed May 3, 1946  4 Sheets-Sheet 2
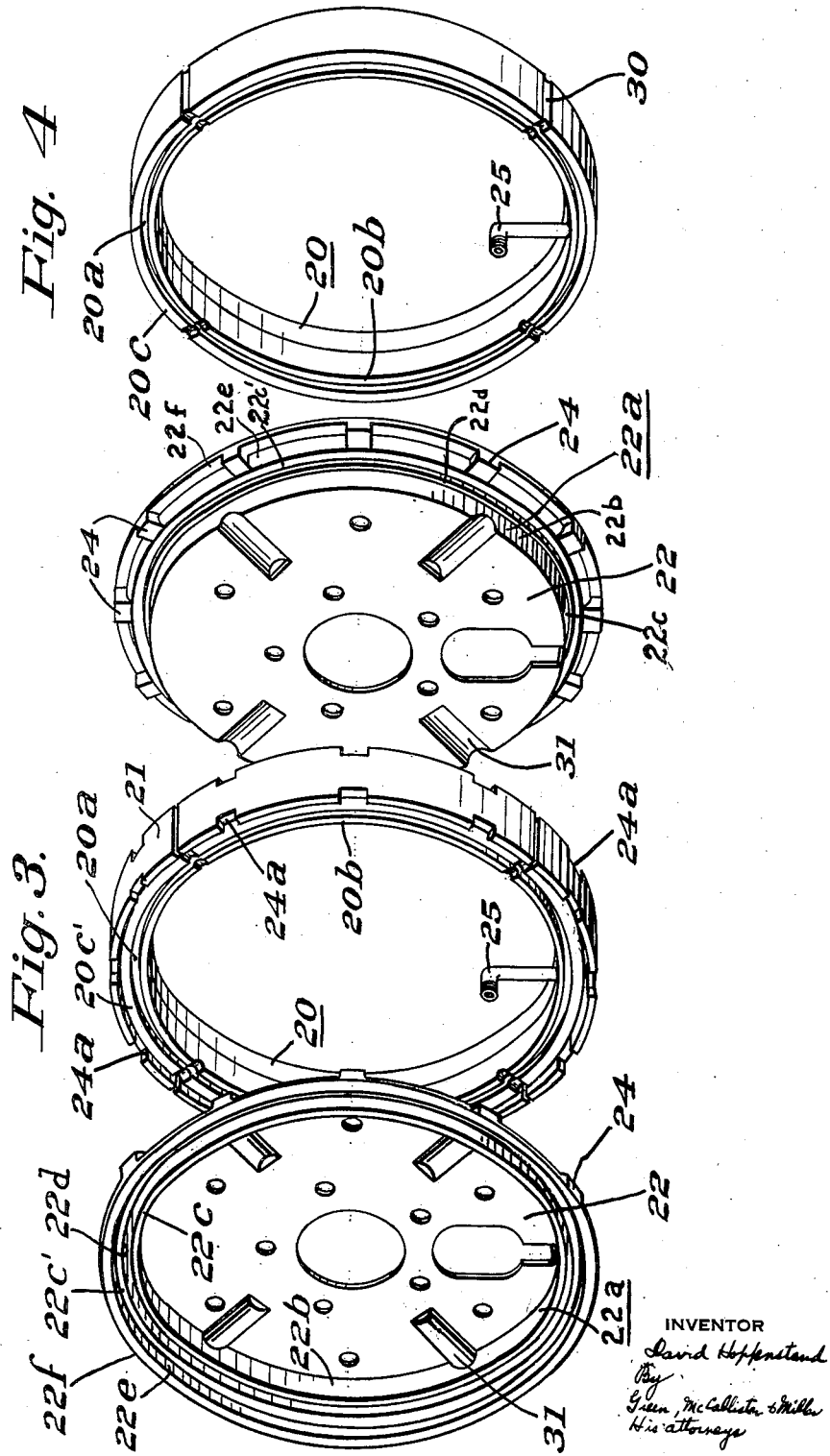

INVENTOR
David Hoppenstand
BY
Green, McCallister & Miller
ATTORNEYS

Patented June 2, 1953

2,640,565

UNITED STATES PATENT OFFICE 2,640,565

BRAKE STRUCTURE

David Hoppenstand, Greenville, Pa., assignor to Hoppenstand Brake Corporation, a corporation of Pennsylvania Continuation of abandoned application Serial No. 666,994, May 3, 1946. This application July 14, 1950, Serial No. 173,848

21 Claims. (Cl. 188—152)

This invention relates to brake structure, and more particularly, to an expander type of brake structure for vehicles such as automobiles, trucks, etc. and other mechanisms on which frictional or brake structures may be employed.

There have been many types of brake assemblies, but those which are now generally used employ pivotally mounted brake shoes equipped with brake linings adapted to engage a brake drum or similar element. My Patent No. 2,212,422 of August 20, 1940 illustrates a type of brake structure which is a radical departure from what may be termed the "present day" conventional brake assemblies. It, nevertheless, exemplifies a practical and highly effective type of brake structure. My present invention constitutes an improvement on expander types of frictional or brake structures such as are exemplified by my patent.

This is a continuation of my application Serial No. 666,994 of May 3, 1946 which is abandoned in favor of the present application.

An object of the present invention is to produce a frictional or brake structure which is of simple construction, is effective in operation and is comparatively inexpensive to produce and to maintain as a highly effective operating structure.

A further object of the invention is to produce an expander type of frictional structure which responds quickly and positively to both the application and the withdrawal of actuating force.

A further object is to produce a frictional or brake structure capable of being actuated by fluid pressure and in which substantially all the available actuating pressure is effectively employed in the application of braking force.

A further object is to produce a fluid pressure actuated brake structure which responds substantially instantaneously to increases and decreases of actuating pressure in the application and the withdrawal of braking force.

A further object is to produce a fluid pressure actuated brake structure such that the braking elements thereof substantially instantaneously respond to the application of actuating pressure and progressively increase the intensity and effectiveness of the braking force in response to increasing actuating pressure.

A further object is to produce an expander type of brake structure such that the braking force is progressively increased somewhat independently of the rate at which actuating force is applied and, conversely, in which the braking force is progressively decreased somewhat independently of the rate at which the actuating force is decreased.

These and other objects, which will be made apparent by the further description of my invention, are obtained by apparatus embodying features, such as illustrated in the accompanying drawings, wherein—

Figure 3 is a reduced exploded perspective view in elevation of a brake structure embodying my invention and somewhat similar to that of Figure 1.

Figure 4 is a perspective view in elevation of a form of expander tube constructed in accordance with my invention.

Figures 1, 2:
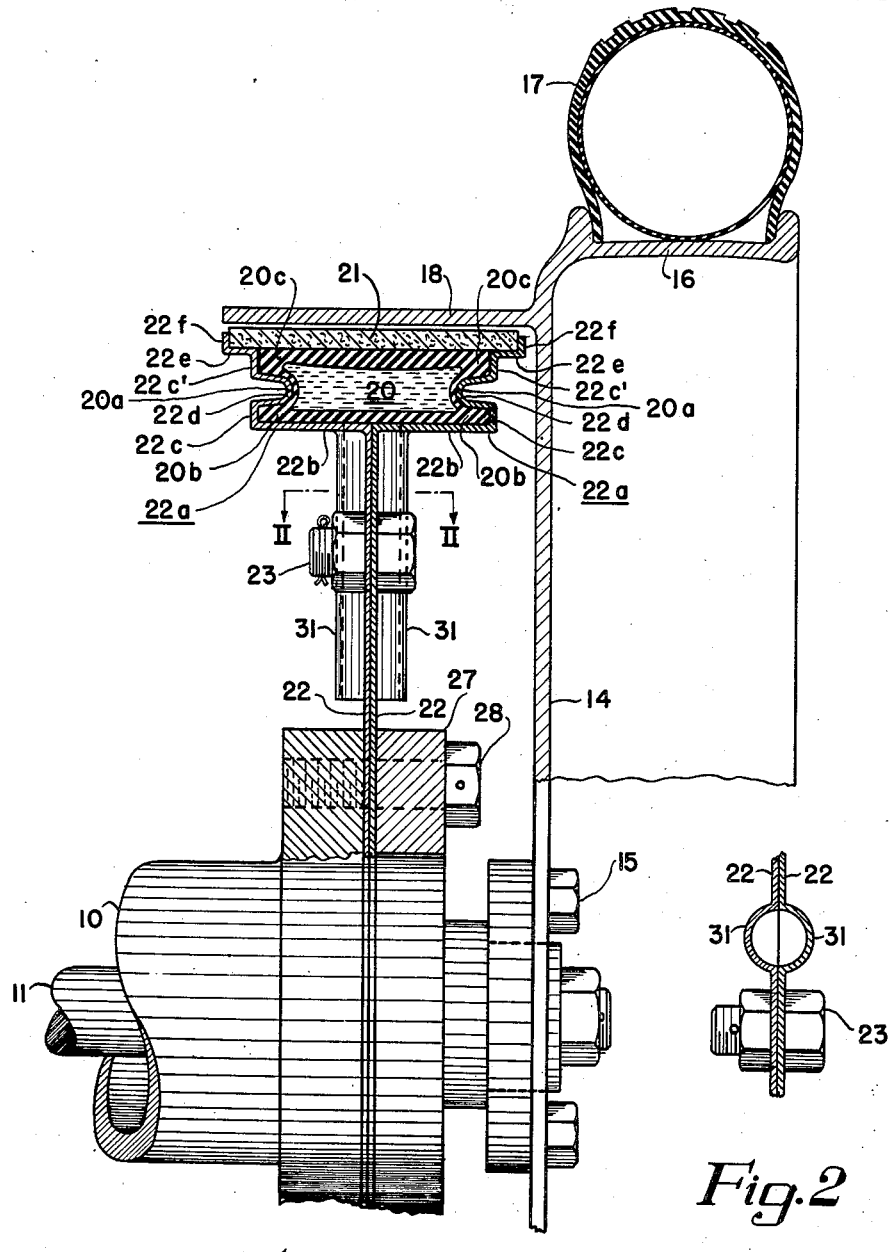
Figure 1 is a transverse section in vertical elevation through a brake structure embodying my invention. This view shows some conventional vehicle hub, axle, tire and brake drum features which are not a part of my invention.
Figure 2 is a horizontal fragmental detail section along the line II—II of Figure 1 and showing an air flute.

Expander types of brake structures are old, but they have not been commercially employed to any substantial extent because of difficulty encountered in their production and operation. By way of example, it is noted that an effective brake structure must be of simple construction; it must be capable of responding almost instantaneously to the application of an actuating force, but it must also respond thereto in such a way that the resulting application of braking force is progressively increased from a minimum application to a maximum application which is substantially commensurate with the intensity of the actuating force; it must be capable of responding instantaneously to the withdrawal of actuating force; and, it must embody such structural features that it can be readily and easily applied to machines or mechanisms with which it is to be used.

The production of such a brake structure is the primary object of the present invention and one aspect of my invention broadly consists of a brake structure including therein a hollow expansible member in the form of an annular resilient tube that constitutes a support for a circular series of segmental brake elements and is adapted to receive actuating fluid pressure within the hollow interior thereof; the annulus is so confined that substantially each change in operating pressure is immediately effective and almost wholly expended in moving said brake elements either toward or away from a cooperating element by means of which they apply a braking force.

In the illustrated embodiment of my invention, the expansible member is made from resilient material, such as rubber; is sufficiently rigid to be self-sustaining in the form of a hollow annulus; is adapted to receive actuating fluid (gas or liquid) within its hollow interior; and, is so confined by rigid (preferably metallic) walls that the response thereof to variations in the pressure of the actuating fluid is almost entirely in a depthwise or radial direction and is almost wholly expended in applying or withdrawing braking force.

The resilient expansible member constitutes a support for segmental elements or bands of friction surface or brake material, such as brake lining for automobile brakes. These segmental bands are shown preformed as segments of a circle and, as employed in the structure illustrated, surround a peripheral face of the expansible member and are preferably secured thereto so that they and the member constitute a unitary structure and cooperate in responding to variations in the pressure of the actuating fluid within the interior of the member. In the illustrated embodiment, the expansible member or annulus, its confining walls and the circular series of segmental lining elements are secured to an element of the mechanism with which they are to be used and they are so mounted that the segmental braking elements are in an operative-contactual relationship with or are surrounded by an annular, cooperating braking element, for example, a brake drum which is rotatable with relation to the segmental braking elements, the resilient annulus, and its support structure which involves the above-mentioned confining walls.

One of the characterizing features of the present invention is that braking force is progressively applied by it, independently of the rate at which the actuating pressure is increased. In the illustrated embodiment, this is accomplished by so preforming the segmental braking elements and so correlating them with the resilient annulus that the radius of curvature of each segment, carried by a peripheral face of the resilient annulus, is different from that of the brake drum or braking element which cooperates with those segments, at the instant of initial contact between element and drum in the operation of applying a braking force. Under such conditions, the first contact between each segmental element and the adjacent face of the brake drum is in the nature of a line contact, which increases, as to the extent or area of surface contact, as the segmental element is flexed by the increasing pressure of the actuating fluid within the resilient annulus. With such an arrangement, the response of the resilient annulus to an increasing actuating pressure is first an expansion thereof which moves the segmental braking elements substantially radially and also longitudinally or circumferentially into contact with the surrounding brake drum. Increasing pressure within the resilient annulus not only increases the pressure between the cooperating brake surfaces, but also tends to and, if of sufficient magnitude, does flex or distort each segmental element of semi-rigid flexible form, thus tending to move the entire extent of its braking surface into intimate contact with the cooperating surface of the drum. In this way the braking effect is progressively increased, not only by the increase in braking pressure, but also by the increase in the extent of surface made effective as braking surface by the flexing of the segmental elements. Even if the preformed radius of curvature of the braking or frictional surface elements is substantially the same as the radius of the cooperating friction surface member, sensitive, transverse or lateral expansible joint portions of the expansible members or annulus are actuated to contribute to a progressive increase of braking action substantially uniformly by each element.

A reverse action takes place as the actuating pressure is decreased after an application of braking force. That is to say, the cooperative effect of the resilient annulus and the segmental braking elements supported by it, is such as to occasion a progressive decrease in the effective braking surface as the actuating pressure within the annulus is decreased. This is all due to the resiliency of the so-called "unitary structure," resulting from the inherent characteristics of that structure and its cooperative relationship with the illustrated mounting structure.

In the make-up of this structure, I prefer to employ segmental braking elements which, while more or less rigid or of closely compacted material, respond to flexing forces, but resist distortion occasioning dimensional change (elongation or spread) which results from plastic flow of the material of which the braking elements are formed. By employing such elements, I, in effect, reinforce the portions of the resilient annulus to which the elements are secured and, in this way, prevent, or at least restrict, the plastic flow of the portions of the annulus so reinforced with the result that the only portions of the annulus which readily respond to increases in actuating pressure, are the unreinforced portions adjacent ends of the end-to-end positioned segmental elements, as assured by making them more yieldable or extensible than adjacent face portions of the annulus. Thus, it is apparent that by locating the segmental braking elements in spaced relation around the peripheral face of the resilient annulus and by securing those elements to the annulus in that relationship, I produce a unitary structure made up of reinforced or substantially non-expansible portions connected together by expansible joints or lateral portions of greater resiliency than the first-mentioned portion. When the expansible member is expanded and contracted, these, as shown, lateral-groove-defined extensible joints are actuated, flexed, expanded or contracted to provide a substantially uniform application and release of braking action. It is these joints that readily respond to the variations in actuating pressure within the resilient annulus and which, in responding to increases in such pressure, cause a V-ing out of the side walls of the annulus and an outward radial movement of the segments as they move farther apart.

From the above, it will be apparent that the make-up of the so-called "unitary structure" contributes to a flexing of the individual segmental braking elements and, therefore, contributes to the progressive application of braking force under increasing actuating pressure.

I have discovered that in order to obtain desired progressive application of braking force, each segmental element should cover a substantial portion of a circumferential length of the resilient annulus. In the illustrated embodiment I have shown each such element as covering an arc of a little less than 90°. It, however, should be understood that highly desirable results can be obtained by employing segmental elements of somewhat less circumferential length than those illustrated and that the arcuate length of the elements depends, in part, upon their thickness and their degree of flexibility.

By referring to Figure 1 of the drawings, it will be apparent that my invention may be applied to any conventional or any other type of axle and hub assembly of a vehicle or similar mechanism. In this figure, I have shown a vehicle hub 10, an axle 11 and a rotatable wheel portion 14 removably secured to the hub 10 by mounting portions 15. The wheel structure 14 is shown as provided with a conventional form of rim 16 for a tire and tube assembly 17 and with a laterally projecting brake drum 18.

As illustrated in Figure 1, my invention includes the unitary structure heretofore described and a support structure which is shown as rigidly secured to the hub portion 10 of the hub and an axle assembly of a vehicle or other structure. The resilient annulus, forming a part of the unitary structure, is shown in the form of a hollow annular self-supporting tube 20 which is materially wider than its radial thickness or depth. The tube 20 is formed of rubber or similar material and, by the term "self-supporting" I mean that the walls of the tube are such, from the standpoint of thickness and resiliency, that they resist distortion under forces comparable with the weight of the tube, itself. Each intermediate or thinner side wall portion 20d of the tube is provided with a circumferential groove 20a in the outer face thereof which extends concentrically with the inner and outer peripheral faces of the tube and is shown located substantially midway between those faces. With this arrangement each side wall of the tube has annular thickened portions 20b and 20c forming a part thereof and which are located on opposite sides of the groove 20a, i. e., the portion 20b is located inside the circle defined by the groove and the portion 20c is located outside that circle.

The segmental braking elements, forming a part of the unitary structure, are designated by the numeral 21. As shown in Figure 3, they are located in spaced relationship around the tube 20 and each is preferably permanently secured to the peripheral face of the tube. Each element 21 is shown as of somewhat greater width than the width of the tube 20 and each overhangs each lateral edge of the supporting face of the tube.

While the spacing between the elements 21 is such as to provide an appreciable distance between the adjacent ends of adjacent elements 21, the distance is not such as will permit an unrestrained expansion or dilation of the outer peripheral wall of the tube between such ends when the interior of the tube is subjected to substantial actuating fluid pressure. In a brake structure for use with a modern automobile, the spacing of the elements 21 should be such that the adjacent ends thereof will not be more than about an inch apart and should preferably be substantially less than an inch apart. The segmental elements are, of course, so located that they engage the inner or active face of the drum 18 when the resilient annulus 20 is expanded in response to an actuating force applied to the interior of the annulus in the form of fluid pressure.

The support structure for the resilient annulus and the segmental braking elements supported by it are shown in Figure 1 as made up of two similar parts which are adapted to be secured together and which, when so secured, not only support the unitary structure, but also lock that structure in place between them. Each part of the support structure consists of a disc or disc-like portion 22 which is provided with an annular flange 22a around its outer peripheral edge. As shown, the discs 22 are secured together by bolt and nut assemblies 23 and when so secured, the flanges 22a cooperate to form an open trough-like annular compartment which not only supports, but also snugly fits the resilient annulus 20 and locks it in place on the support structure.

Each flange 22a is so formed as to provide an annular supporting wall 22b for the tube 20 which projects substantially at right angles to the body portion of the disc 22. The wall 22b of each flange merges into a substantially radially extending wall 22c—22c' which is shown as corrugated or offset on its outer face so as to form an annular rib 22d on its inner face. Each rib 22d is so formed and located that it enters and intimately engages the corrugation, groove or offset portion 20a in one of the lateral faces of the tube 20 and cooperates therewith in positioning and locking the tube in place on the support structure and against the walls 22b thereof. A reference to Figure 1 will disclose that the opposed ribs 22d of the two parts of the support structure cooperate in locking the resilient annulus 20 to the support structure by clamping the thickened portions 20b against the floor made up of the two wall portions 22b.

The outer or peripheral portion of the wall 22c—22c' of each flange 22a is so formed as to engage the adjacent lateral edges of the segmental elements 21 and to also form an annular shoulder or seat for the adjacent overhanging portions of such elements when the elements are located in their innermost radial positions, i. e., their inactive positions. In the illustrated embodiment, this is accomplished by providing an extension shoulder 22e of the wall 22c' which extends at right angles thereto and which terminates in a radially extending portion 22f. The portion 22f engages the lateral edges of the elements 21 and, with the extension shoulder portion 22e, limits the extent of inward radial movement of the elements.

As shown in Figure 3, the portion 22f of each flange 22a, is so formed as to provide a series of spaced lugs or tongue portions 24 around the edge of the flange which are adapted to interlock with notches or grooves 24a formed in the edges of the segmental elements 21. In this way, each element 21 is locked against rotary or circumferential movement with relation to the flanges 22a, i. e., with relation to the support structure. This interlocking relationship between the support structure and each element 21 is such as to permit the element to move in a substantially radial direction with relation to the flanges 22a in response to variations in actuating pressure applied to the interior of the resilient annulus 20.

From the foregoing, it is apparent that the support structure illustrated is such that it limits the movement of each braking element to movement in a substantially radial direction. It also provides a stop for each such element as it moves away from the brake drum which holds it in a position adjacent to, but at the same time out of contact with, the drum.

Figure 10:
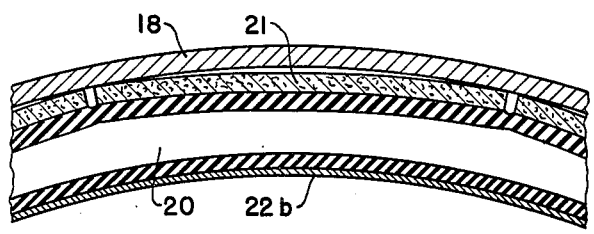
Figure 10 is a side fragmental section in elevation of the embodiment of my invention shown in Figure 1 and taken inside the support structure therefor. This view shows an initial structural relationship after a force application has been applied.
Figure 11:
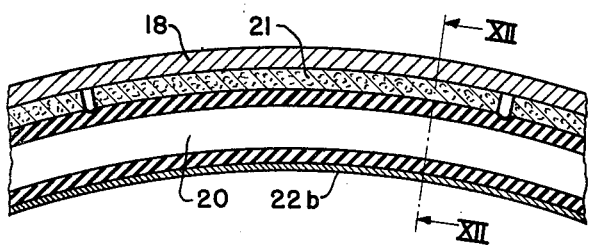
Figure 11 is a view similar to Figure 10, but showing a final structural relationship after the force application has been increased.
Figure 10A:
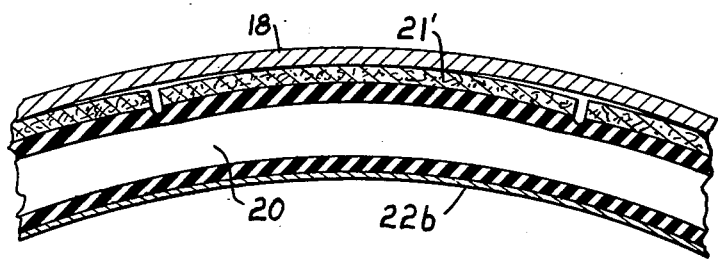
Figure 10A is a view similar to Figure 10, but shows the braking elements 21' as having a normal or preformed radius of curvature less than that of the brake drum.
Figure 9:
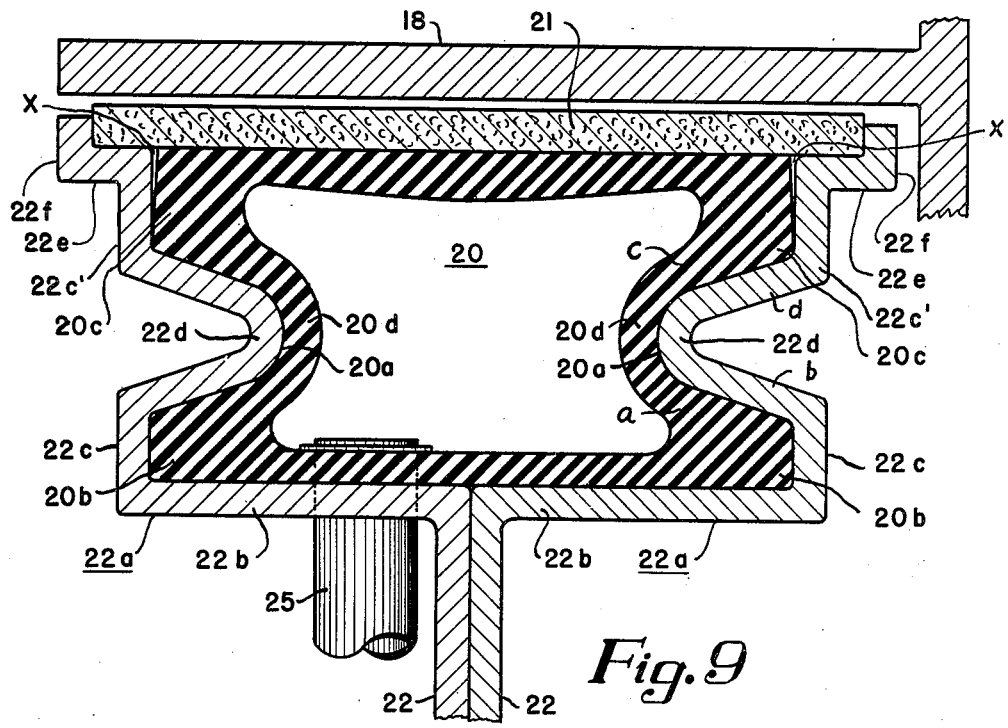
Figure 9 is an enlarged fragmental transverse section in elevation of the brake structure of Figure 1, but taken adjacent a fluid connection for the expander tube shown. It shows the structural relationship before a force application thereto and the elements 21 as having a normal or preformed radius of curvature greater than that of the drum 18.

That is to say, the supporting structure and the so-called "unitary structure" are so correlated and so positioned with relation to the brake drum 18 that a very small outward movement of the braking elements 21 accomplishes a full application of braking force (see Figures 11 and 12), whereas a corresponding movement in the opposite direction completely withdraws the elements 21 from contact with the brake drum 18, see Figure 9. A form of apparatus for obtaining progressive application and also progressive release of braking force is disclosed in Figure 10, wherein the radius of curvature of each of the preformed braking elements 21 is greater than the radius of curvature of the brake drum 18. As previously indicated, I also contemplate apparatus wherein the radius of curvature of the preformed braking elements 21 is less than that of the brake drum, see Figure 10A. With such elements, progressive application and withdrawal of braking force will be accomplished, although the initial contact between each such element and the brake drum will be intermediate the ends of the element.

The operation of mounting the unitary structure on the two part support structure, so that the two structures are, in effect, combined to form a single mechanism, is very simple. Each disc 22 is so located with relation to the resilient annulus 20 that the portion 22b of its flange 22a enters the space surrounded by the annulus, or in other words, the enclosed fluid pressure chamber defined by the lateral side walls and the inner and outer peripheral walls of the tube or annulus, and engages the inner peripheral face of the annulus. The two discs are then moved into contact with each other and secured together, thus forming the previously mentioned annular compartment. In moving the two portions of the support structure into contact with each other, the opposed ribs 22d move into the grooves 20a formed in the opposed lateral faces. This, in itself, locks the resilient annulus within the compartment. As previously noted, each rib 22d is so positioned with relation to the outer peripheral face of the cooperating wall 22b that each thickened portion 20b of the tube 20 is gripped by one of the walls 22b and ribs 22d as the opposed parts of the support structure are moved into contact with each other, and thus clamped to the support structure.

I have heretofore used the term "snugly fit" in describing the relationship between the resilient annulus 20 and the walls of the compartment of the support structure in which it is located. By this is meant a relationship which substantially prevents spread of the annulus 20 in response to fluid pressure within the interior thereof. It will be apparent that the clamping of the thickened portions 20b of the annulus locks those portions in place and prevents relative movement between them and the mounting structure. It will also be apparent that the ridge of each of the ribs 22d extends to the bottom of the cooperating groove 20a and, therefore, prevents or limits lateral spread of the annulus in the vicinity of the ribs 22d. On the other hand, the relationship between the support structure and the outer peripheral wall and the adjacent portions of the side walls of the annulus 20 must be such as to permit the annulus to freely respond to actuating pressure in moving the contact elements 21 outwardly into contact with the brake drum 18. For this reason the fit between the portions of the annulus and the portions of the support structure which extend radially beyond the ribs 22d, must be such as to avoid a clamping action such as is illustrated and described in connection with the portions of the annulus which are located inwardly of the ribs 22d.

In Figure 9, I have illustrated the relationship between the annulus and supporting structure and have indicated some clearance at $x$ between the portions 22c', of the flange 22a, and the thickened portions 20c of the annulus. The amount of this clearance is exaggerated for illustrative purposes, the intent being to disclose that provision is made to accommodate the desired outward movement of the segmental braking elements 21. In the preferred structure, the elements 21 are permanently secured to the outer peripheral face of the annulus 20 and this, together with the thickened portions 20c of the annulus, limits lateral spread of the annulus. It is, therefore, apparent that the desired response of the annulus to an increase in internal pressure is accomplished with a minimum of lateral spread.

As previously stated, the locating of the elements 21 in spaced relationship around the outer peripheral face of the annulus and the securing of those elements to the annulus, reinforces the portions of the annulus to which the elements are secured and, in effect, provides a unitary structure made up of reinforced portions connected together by expansible joints of greater resiliency than the connected adjacent or reinforced portions with the result that the plastic flow of the material of which the annulus 20 is formed, is to a large extent limited to the portions of the annulus located between the adjacent ends of adjacent elements 21. A reference to Figures 1 and 9 will make it apparent that these portions, i. e., the expansible joints, involve the thickened portions 20c on each side of the annulus and particularly, lateral joint portions 30 of its peripheral or longitudinal face wall. Thus, it is apparent that the heretofore mentioned "V-ing out" action in the side walls of the annulus takes place, to a large extent, in the shoulders $c$ of the portions 20d of the side walls toward the joint portions 30 of its face or wall.

This V-ing out necessarily occasions a circumferential growth of the outer peripheral wall of the annulus with the result that this wall and the elements 21 carried by it, move radially outwardly. This movement carries the portions of the side walls of the annulus, in engagement with the outer peripheral face of the ribs 22d, out of such engagement and, therefore, tends to contract the side walls of the annulus and draw them away from contact with the inner faces of the walls 22c' of the flanges 22a. Thus, while the intermediate, grooved or thinner portion 20d of each side wall of the annulus is placed under varying strain by increased actuating pressure, the major portion of the strain is taken up by the thickened portion 20c of the side wall and such flexing of the thinner portion 20d as takes place is in the neighborhood of the well-rounded ridge of the adjacent rib 22d.

As shown in the various drawings, the annulus or tube 20 is several times as wide as it is thick, i. e., deep in a radial direction. While the width of the braking elements 21 will largely control the width of the annulus, I, nevertheless, prefer an annulus of such form that the external width dimension thereof is somewhat more than twice that of the external radial or depth dimension. By so proportioning the dimensions, I am able to employ tubes having adequate wall thickness but which, at the same time, effectively utilize the available actuating pressure without employing an excessive amount of rubber and without unnecessarily increasing the radial dimension of the brake structure as a whole. I am also able to effectively employ a relatively small amount of actuating fluid, to obtain a rapid withdrawal of the brake elements 21 from the brake drum 18 in response to release of brake force, and to maintain a relatively low strain, per unit of tube material, under all operating conditions. It will, however, be understood from a reference to other figures, such as 5, 6 and 8, of the drawings that the form of the resilient annulus 20 may be varied considerably as to form or contour while retaining therein those features which are essential to my invention.

Figure 5:
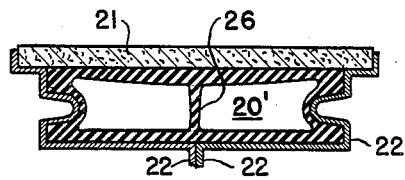
Figures 5 and 6 are transverse sectional views showing modified expander tube embodiments of my invention.
Figure 6:
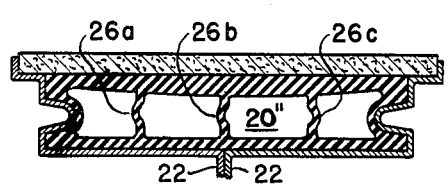

In Figure 5 I have shown a modified form of annulus or expander tube 20' which is reinforced circumferentially by means of an internal web 26 which is located midway between the side walls of the tube and divides the interior thereof into two chambers of equal capacity. A still further modification of the expander tube 20'' is shown in Figure 6 wherein the tube is provided with three internal webs 26a, 26b and 26c, each of which is fluted in such a way as to contribute to an accordion-like action in response to variations in pressure within the tube. Where internal ribs are employed which, in effect, constitute circumferentially extending partitions within the pressure chamber of the tube, it is necessary to provide some means for equalizing the pressure on opposite sides of each such partition. This may be done by perforating the partitions or by employing a separate inlet passage to each subdivision of the internal chamber formed by the internal ribs.

In Figure 9, I have disclosed means such as may be employed for delivering fluid under pressure to, and for discharging such fluid from, the interior of the resilient annulus or expander tube 20. As there shown, a connection 25 passes through the wall portion 22b of a flange 22a of one of the support members and also through the inner peripheral wall of the tube 20. The connection 25 may form a means of communication between the interior of the tube 20 and a source of variable pressure such as a hydraulic or pneumatic cylinder and an associated pedal actuated piston (not shown), see for example, the Lockheed system.

While a rib or ribs, such as the rib 26 of Figure 5, tend to resist collapse of the hollow tube 20' when the interior thereof is subjected to subatmospheric pressure, it will be apparent that the locking rings or ribs 22d limit this tendency to the extent of substantially preventing total collapse. Then too, by mounting the connection 25 to one side, as shown in Figure 9, it is impossible to totally close off the inner end of that connection by a collapse of the tube. Aside from this however, the structural features of the unitary structure and mounting structure, as illustrated in Figures 1, 3 and 9 are such as to prevent collapse, and particularly where the braking elements 21 are secured to the outer peripheral wall of the resilient annulus 20.

In Figure 4 I have shown the outer peripheral face of the tube or annulus 20 as provided with transversely extending grooves 30 which are spaced around the annulus. These grooves have the effect of dividing the annulus into separate sections with expansible joints between the sections and independently of whether or not the segmental elements 21 are secured to the tube. As shown, I also extend the grooves 30 laterally across the longitudinal, peripheral wall or face of the tube so that each groove cuts across one or both of the external faces of the thickened portions 20b and 20c of the side walls of the tube. Where the braking elements 21 are secured to the outer peripheral wall of the tube, as previously described, each groove 30 is located between adjacent ends of adjacent braking elements and, therefore, accentuates the response of the previously mentioned expansible joints to variations of the actuating pressure within the tubes. It provides a lateral expansion joint of increased extensibility and is spaced longitudinally along the outer peripheral wall or face of the annulus or tube to provide a V-ing out action laterally-uniformly across the expansible wall or face.

Figure 7:
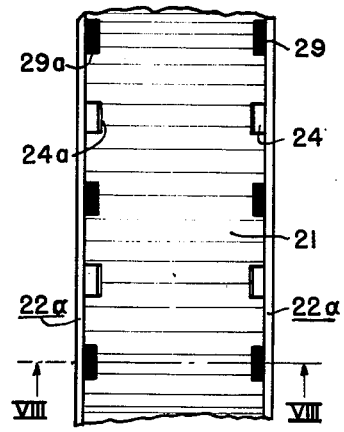
Figure 7 is a segmental top plan view of a brake structure constructed in accordance with another embodiment of my invention.
Figure 8:
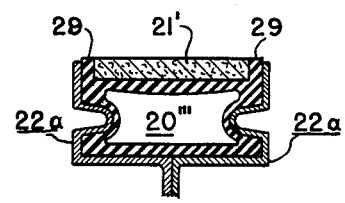
Figure 8 is a transverse section along the line VIII—VIII of Figure 7.

In Figures 7 and 8 I have shown a still further modification of the expansive tube illustrated in Figure 1. As there shown, the tube 20''' is provided with spaced lugs 29, located on the peripheral face of the tube and along the edges thereof. These lugs are adapted to cooperate with corresponding notches 29a formed in the edges of the braking elements 21' and thus form a locking connection between the elements and the tube. It will be understood that the lugs 29 may be employed even though the structure also includes the interlocking grooves and slots 24, 24a illustrated in Figure 3. I, however, should state that I prefer to employ a form of tube 20, 20' or 20'' which can be extruded in sections of desired length and then be cut and fabricated into the annular tubes here illustrated and described in connection with Figures 1, 3, 4, 5 and 6.

Another feature of my invention is the provision of air passages which extend substantially radially of the discs 22 and terminate within the confines of the cooperating peripheral flanges of the two-part support structure. As illustrated in Figures 1 and 2, these passages are formed by flutes 31 which may be pressed into each disc portion 22 and which are so located that the flutes of one disc cooperate with those of the other in providing a radially extending passage of substantially circular cross section, as shown in Figure 2. The flutes may extend to the inner peripheral edge of each disc 22 and thus provide stiffening ribs on the discs. However, as shown in Figure 1, each flute is so formed that the resulting passage is open at the hub end thereof with the result that the cooling surface of the support structure is increased and the passages may be employed for the purpose of promoting air flow toward and away from the inner peripheral face of the resilient annulus 20.

As shown in Figure 1, the two-part support structure is secured in place on an extension of the hub 19 by means of a locking ring 27 and bolts 28. The locking ring and the bolts are shown as accessible from the wheel side of the hub, thus making it possible to easily install a brake structure comprising a unitary structure secured to and locked in place on a two-part supporting structure.

Figure 12:
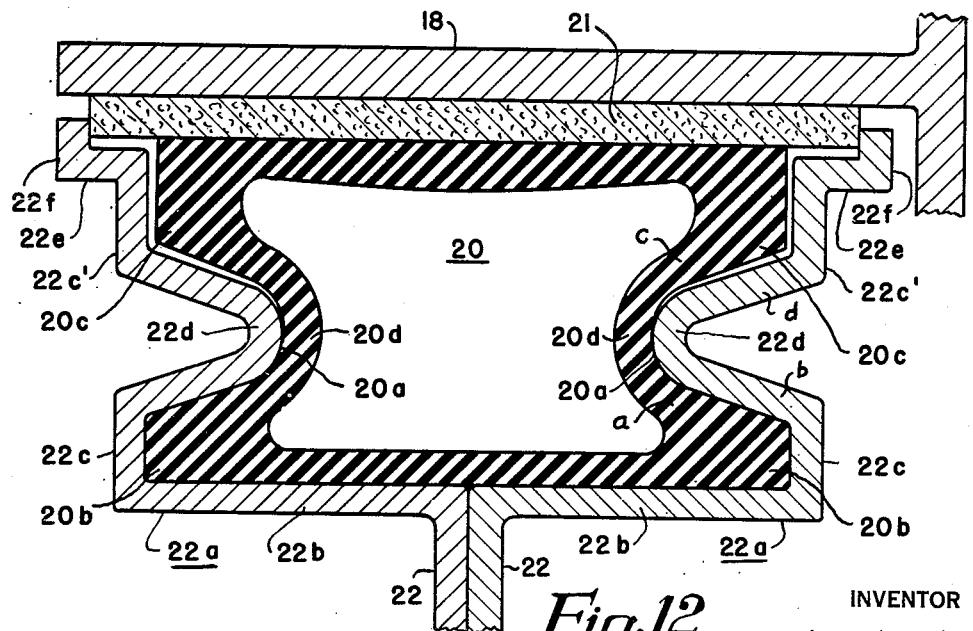
Figure 12 is an enlarged transverse or lateral fragmental section taken along the line XII—XII of Figure 11.

As shown particularly in Figures 9 and 12, the resilient-deformable annulus 20 is provided with offset portions 20d of lesser thickness or greater extensibility which project within or are deformed inwardly into the hollow chamber defined by the walls of the annulus and which are provided with depthwise spaced-apart and laterally-extending shoulders a and c. It will be noted that the shoulders a and c terminate in the thickened portions 20b and 20c, respectively. By comparing Figure 12 with Figure 9, it will be seen that the expansion and contraction of the annulus is effected principally from the side shoulders c and the thickened portions 20c which are connected to the upper or outer flange or face wall thereof and that expansion and contraction of the annulus is controlled by or about the offset portions 20d of the annulus and the corresponding offset portion 22d of the support structure. The offset portions 22d of the support structure which may be termed ribs, are connected by depthwise spaced-apart and laterally-projecting shoulders b and d which fit within the respective shoulders a and c of the annulus.

It will be apparent to those skilled in the art that the principles of my invention may be applied to clutch and other structures and that various additions to, omissions from and modifications of the structure illustrated may be made without departing from the spirit and scope of my invention as defined by the appended claims.

I claim:

1. In a frictional structure adapted to operably contact an annular member provided with a friction surface having a suitable radius of curvature, a resiliently-deformable expansible annulus in an operable relationship with respect to said annular member, a series of arc-shaped friction-surface-carrying segmental elements of semi-rigid flexible construction secured in an end-to-end relationship on a peripheral wall of said annulus, said elements when secured on said annulus have a different normal radius of curvature than the friction surface of said annular member, a support structure positioning said annulus and said elements in an operative relationship with respect to the friction surface of said annular member and constructed to direct expansion of said annulus radially toward said annular member, said annulus having expansible joints in its said peripheral wall adjacent the ends of said elements to provide a circumferential growth of its said peripheral wall when said annulus is expanded, said annulus being constructed and arranged when expanded to flex said elements and progressively change their radius of curvature toward the radius of curvature of the friction surface of said annular member to effect and increase frictional surface contact between the friction surfaces of said annular member and said elements, said expansible annulus having a hollow internal fluid pressure chamber, said annulus and said support structure having engaging offset portions on laterally-opposite sides thereof about which said annulus is constructed and arranged to expand and contract, means for applying an expansion force to said annulus, and said means being constructed to place the chamber of said annulus in communication with a source of fluid pressure.

2. In a frictional structure having an annular friction member, an annular series of curved and flexible frictional elements located in an operative relationship with respect to the friction member, each of said frictional elements being of closely compacted composition material and having a radius of curvature different from the radius of curvature of the annular friction member, a support structure engaging said elements and limiting their movement to a radial movement substantially toward and from the friction member, a pressure-actuated expansible means carried by said support structure, said frictional elements being operably secured on said expansible means, said support structure and said expansible means having engaging offset portions limiting radial movement of portions of said expansible means with respect to said support structure, said expansible means having side portions constructed and arranged to expand radially outwardly and contract radially inwardly about said engaging offset portions and to thus move said elements into and out of frictional engagement with said annular friction member.

3. In a frictional structure as defined in claim 2 wherein each of said elements has a preformed normal lesser longitudinal radius of curvature than said annular friction member.

4. In a frictional structure as defined in claim 2 wherein each of said elements has a preformed normal greater longitudinal radius of curvature than said annular friction member.

5. An integral resiliently-deformable expander tube constructed to be mounted on a support structure and to interlock over side ribs thereof for moving a friction surface radially into frictional engagement with a relatively moving friction member, said expander tube having depthwise spaced-apart inner and outer longitudinally-extending flange walls, said tube having laterally spaced-apart side walls integrally connecting said flange walls adjacent side edges thereof, said flange and side walls being of resilient material and defining a self-supported hollow fluid-pressure-sensitive chamber within said tube, a series of endwise positioned rigidly-flexible friction surface elements secured on the outer flange wall of said tube, each of said elements having a normal preformed different radius of curvature than said tube, each of said side walls having a laterally-extending offset portion integrally connected by depthwise spaced-apart shoulders to side edges of said flange walls, the offset portions of said side walls having a lesser thickness than said flange walls, said expander tube having a substantially greater lateral than depth dimension, and a fluid pressure connection to said tube.

6. An integral resiliently-deformable expander tube constructed to be mounted on a support structure and to interlock over side ribs thereof for moving a friction surface radially into frictional engagement with a relatively moving friction member, said expander tube having depthwise spaced-apart inner and outer longitudinally-extending flange walls, said tube having laterally spaced-apart side walls integrally connecting said flange walls adjacent side edges thereof, said flange and side walls being of resilient material and defining a self-supported hollow fluid-pressure-sensitive chamber within said tube, each of said side walls having a laterally-extending offset portion integrally connected by depthwise spaced-apart shoulders to side edges of said flange walls, the offset portions of said side walls having a lesser thickness than said flange walls, said expander tube having a substantially greater lateral than depth dimension, and a fluid pressure connection to said tube, and at least one resilient fluted rib extending depthwise across the hollow chamber thereof and integrally connected between said flange walls.

7. In a frictional structure adapted to operably contact a member having a friction surface, a resiliently-deformable expansion member having a longitudinal face wall and a pair of laterally spaced-apart side walls extending depthwise from said longitudinal face wall, a support structure positioning said longitudinal face wall in an operably-opposed relationship with respect to the friction surface of said first-mentioned member and having side walls substantially enclosing the side walls of said resiliently-deformable member, adjacent side walls of said support structure and of said resiliently-deformable member having a pair of interlocking portions, one interlocking portion of said pair being in the adjacent side wall of said resiliently-deformable member and having a pair of depthwise spaced-apart and laterally-projecting shoulders, the other interlocking portion of said pair projecting laterally-inwardly into the spacing between the shoulders of said first-mentioned interlocking portion, and means for applying an expansion force to said resiliently-deformable member.

8. In a friction structure as defined in claim 7 wherein, said other interlocking portion of said pair also has a pair of depthwise spaced-apart and laterally-projecting shoulders.

9. In a friction structure adapted to operably contact a member having a friction surface, a resiliently-deformable expansion member having a pair of depthwise spaced-apart longitudinal face walls and a pair of laterally spaced-apart depthwise-extending side walls connecting said longitudinal face walls and defining an enclosed hollow fluid chamber therebetween, a support structure supporting one of the face walls of said resiliently-deformable member and having side walls extending along and supporting adjacent side walls of said resiliently-deformable member to position the other face wall of said resiliently-deformable member in an operably-opposed relation with respect to the friction surface of said first-mentioned member, the side walls of said resiliently-deformable member having laterally-offset portions intermediate its face walls and along its hollow enclosed chamber, the side walls of said support structure having laterally offset portions interlocking with adjacent laterally-offset portions of said resiliently-deformable member to secure said resiliently-deformable member on said support structure, means for placing the enclosed chamber of said resiliently-deformable member in communication with a source of fluid pressure, and said engaging laterally-offset portions being positioned to support said resiliently-deformable member against collapse when fluid pressure is relieved in the enclosed hollow chamber thereof.

10. In a frictional structure having a friction drum, a substantially annular series of arc-shaped, flexible friction elements located in an end-to-end relation to each other and in operative relationship with an inner peripheral face of said drum; a support structure engaging each such element and limiting the movement thereof relatively to said structure to a substantially radial movement toward and away from said drum; a self-supporting resilient annulus having spaced-apart walls defining and enclosing a hollow fluid chamber therein, said annulus being surrounded by said series of elements and having its outer peripheral face secured to each such element, said annulus having a grooved portion in each side wall thereof, means on said support structure engaging the grooved portion in each side wall of said annulus and locking said annulus to said structure, said support structure extending radially on opposite sides of and beyond said grooved-portion-engaging means to support the side walls of said annulus and limit lateral spread thereof; and means for placing the interior of said annulus in communication with a source of fluid pressure.

11. In a frictional structure having a friction drum, a unitary structure located within said drum in operative relationship therewith and comprising a substantially annular series of spaced, segmental friction elements and a resilient annulus operatively secured to said elements and having expansible joints at the spaces between said elements; said resilient-annulus having walls defining an enclosed chamber; a support structure for said annulus engaging each such element and limiting the movement thereof, relative thereto, to movement substantially toward and away from said member; said annulus having grooved portions in side walls thereof; opposed offset portions on said support structure engaging the grooved portions in the side walls of said annulus and locking said annulus to said support structure and being constructed and positioned with respect to the side walls of said annulus to substantially limit the expansion of said annulus to a circumferential growth from the grooved portions thereof; and, means for delivering fluid pressure to the enclosed chamber of said annulus.

12. In a frictional structure having a friction drum, a hollow, self-supporting, resilient annulus located within the confines of said drum, each side wall of which is thickened adjacent each peripheral wall thereof and is provided with a circumferential grooved portion intermediate such peripheral walls and substantially concentric with at least the outer peripheral face thereof; a series of friction elements surrounding said annulus and secured in spaced relationship to the outer peripheral face thereof in operative relationship with the inner face of said drum; a support structure for said annulus positioned to extend along the side walls of said annulus and side edges of said elements and engaging said circumferential grooved portions in the side walls of said annulus; said support structure being constructed and positioned to limit lateral expansion of the side walls of said annulus and to limit the movement of each such element with relation thereto to a movement substantially toward and away from said drum; and, means for delivering fluid pressure to the interior of said annulus.

13. In a frictional structure, a resilient annulus having an annular enclosed fluid chamber formed therein and a circular grooved portion formed in the external face of each side wall thereof and located substantially concentrically with an outer peripheral wall thereof, the circular grooved portions of the side walls of said annulus projecting inwardly towards the enclosed fluid chamber thereof, a series of arc-shaped friction elements located in an end-to-end and spaced relationship around and secured to the outer peripheral face of said annulus, a two-part support for said annulus clamped thereto and limiting the lateral expansion thereof and having opposed circular ribs each projecting into one of the grooved portions, means for placing the interior of said annulus in communication with a source of fluid pressure, and a friction drum surrounding said annulus and located in operative relationship with said series of friction elements.

14. In a frictional structure, a friction element; a resilient annulus having inner and outer peripheral walls connected by side walls and defining an enclosed hollow fluid chamber; said friction element being positioned in an operative relationship on the outer peripheral wall of said resilient annulus; the side walls of said annulus being deformed inwardly within the hollow fluid chamber; a support structure about said resilient annulus and positioned with respect to said annulus in such a manner as to substantially limit expansion of said annulus toward the outer peripheral wall thereof; said support structure having a pair of annular ribs, each of which projects into one of the deformed side walls of said annulus; and, means connected to the fluid chamber of said resilient annulus for supplying fluid pressure thereto.

15. In a frictional structure, a hollow resilient annulus having a lateral width substantially greater than its radial depth and wall thicknesses such as to render the same substantially self-supporting and a circumferential groove formed in each side wall thereof substantially concentric with one peripheral face thereof; a series of arc-shaped friction elements secured to an outer peripheral face of said annulus located thereon in an end-to-end spaced relationship and each having a length circumferentially of such peripheral face of not substantially less than 90°; a support structure having opposed side walls, each in clamping engagement with a portion of one side wall of said annulus, and each provided with a circular rib projecting into one of said grooves; means carried by said support structure engaging said elements and limiting the movement of each such element relatively to said support structure to a substantially radial movement with reference to said ribs; a friction drum surrounding said annulus in an operative relationship with said series of elements; and, means for connecting the interior of said annulus with a source of fluid pressure.

16. In a friction structure, a fluid pressure actuated resilient annulus, said annulus having inner and outer peripheral walls normally supported in a spaced-apart relationship with respect to each other by and defining an enclosed hollow fluid chamber with spaced-apart side walls, a support structure for the resilient annulus having a pair of radially-extending disc-like portions, each of said disc-like portions terminating at its outer end in a laterally-outwardly-extending flange, each of said flanges having a radially-outwardly-extending annular supporting wall, the disc-like portions of said support structure being constructed and arranged to be secured in abutting relationship with respect to each other, said support structure when its disc-like portions are in a secured relationship with each other defining a trough-like annular compartment within which said annulus is positioned, each of the annular supporting walls of said support structure having a circular portion projecting into an interlocking relationship with one of the side walls of said annulus substantially intermediate inner and outer peripheral walls of said annulus, at least one friction element operably secured on the outer peripheral wall of said annulus, each of the annular supporting walls of said support structure having a portion constructed and arranged to extend along a side edge of said friction element and to limit movement of said friction element to a radial movement with respect thereto, a friction member disposed about said friction element, said annulus being constructed and arranged when actuated to expand radially-outwardly within the trough-like annular compartment of said support structure and move said friction element into frictional engagement with said friction member, and means for supplying actuating pressure fluid to the chamber of said annulus.

17. In a frictional structure as defined in claim 16 wherein, a series of spaced-apart flutes extend from the trough-like annular compartment of said support structure and radially along between the disc-like portions of said support structure, and each of said flutes is open at one end to a side of at least one of the disc-like portions.

18. In a frictional structure adapted to operably contact a friction surface member and having means for positioning an expansible member in an operative relationship with respect to the friction surface member and to direct expansion of the expansible member toward the friction surface member, a resiliently-deformable expansible member having a pair of face walls integrally connected together in a spaced-apart relationship by a pair of spaced-apart side walls, said face and side walls defining an enclosed hollow fluid-pressure-sensitive chamber within said expansible member, at least a pair of friction elements operably positioned in an end-to-end relationship on one of the face walls of said expansible member and having friction surfaces positioned in an operative-contactual relationship with respect to the friction surface member, an expansible joint laterally across and in said face wall of said expansible member adjacent opposed end portions of said friction elements, said expansible joint being of greater extensibility than portions of said face wall on which said friction elements are operably positioned to provide a V-ing out expansion along said joint, and means for applying fluid pressure to the chamber of said expansible member to actuate said expansible joint and move said friction elements into an operative-contactual engagement with the friction surface member.

19. In a frictional structure as defined in claim 18 wherein, said expansible joint is defined by a wall portion of lesser thickness laterally across said face wall.

20. In a frictional structure adapted to operably contact a friction surface member, a resiliently-deformable expansible member having a pair of face walls integrally connected together in a spaced-apart relationship by a pair of spaced-apart and depthwise-extending side walls, said face and side walls defining an enclosed hollow fluid-pressure-sensitive chamber within said expansible member, each of said side walls being extensible and having a laterally-extending offset portion integrally connected thereto, at least a pair of friction elements operably secured in an end-to-end relationship on one of the face walls of said expansible member and having friction surfaces positioned in an operative-contactual relationship with respect to the friction surface member, a support structure to support the other face wall of said expansible member, said support structure having spaced-apart side walls extending depthwise of and along and supporting adjacently positioned side walls of said expansible member to position said first-mentioned face wall in an operably-opposed relation with respect to the friction surface member, each side wall of said support structure having a laterally-offset portion interlocking with an adjacently positioned offset portion of the side walls of said expansible member, at least one laterally offset side wall portion of each interlocking pair having a pair of depthwise spaced-apart laterally-extending shoulder portions that define a groove for receiving the other offset portion of said interlocking pair to control movement of said expansible member, and means for applying fluid pressure to the chamber of said expansible member to actuate it about said interlocking pairs and move said friction elements into an operative-contactual engagement with the friction surface member.

21. In a frictional structure as defined in claim 20 wherein, an expansible joint extends laterally across and in the one face wall of said expansible member on which said friction elements are positioned, and said expansible joint is located between ends of said friction elements and is of greater extensibility than portions of said face wall on which said friction elements are positioned to provide a V-ing out expansion from said offset portion of the side walls of said expansible member.

DAVID HOPPENSTAND.

References Cited in the file of this patent

UNITED STATES PATENTS

| Number | Name | Date |
|---|---|---|
| 1,020,737 | Austin | Mar. 19, 1912 |
| 1,273,507 | Leonard | July 23, 1918 |
| 2,174,724 | Hunter | Oct. 3, 1939 |
| 2,193,481 | Fawick | Mar. 12, 1940 |
| 2,212,422 | Hoppenstand | Aug. 20, 1940 |
| 2,359,516 | Frank | Oct. 3, 1944 |

FOREIGN PATENTS

| Number | Country | Date |
|---|---|---|
| 436,232 | Great Britain | Oct. 8, 1935 |